No. 747,314. PATENTED DEC. 15, 1903.
J. BRAKELEY.
VINE HARVESTING MACHINE.
APPLICATION FILED JAN. 25, 1901.
NO MODEL.
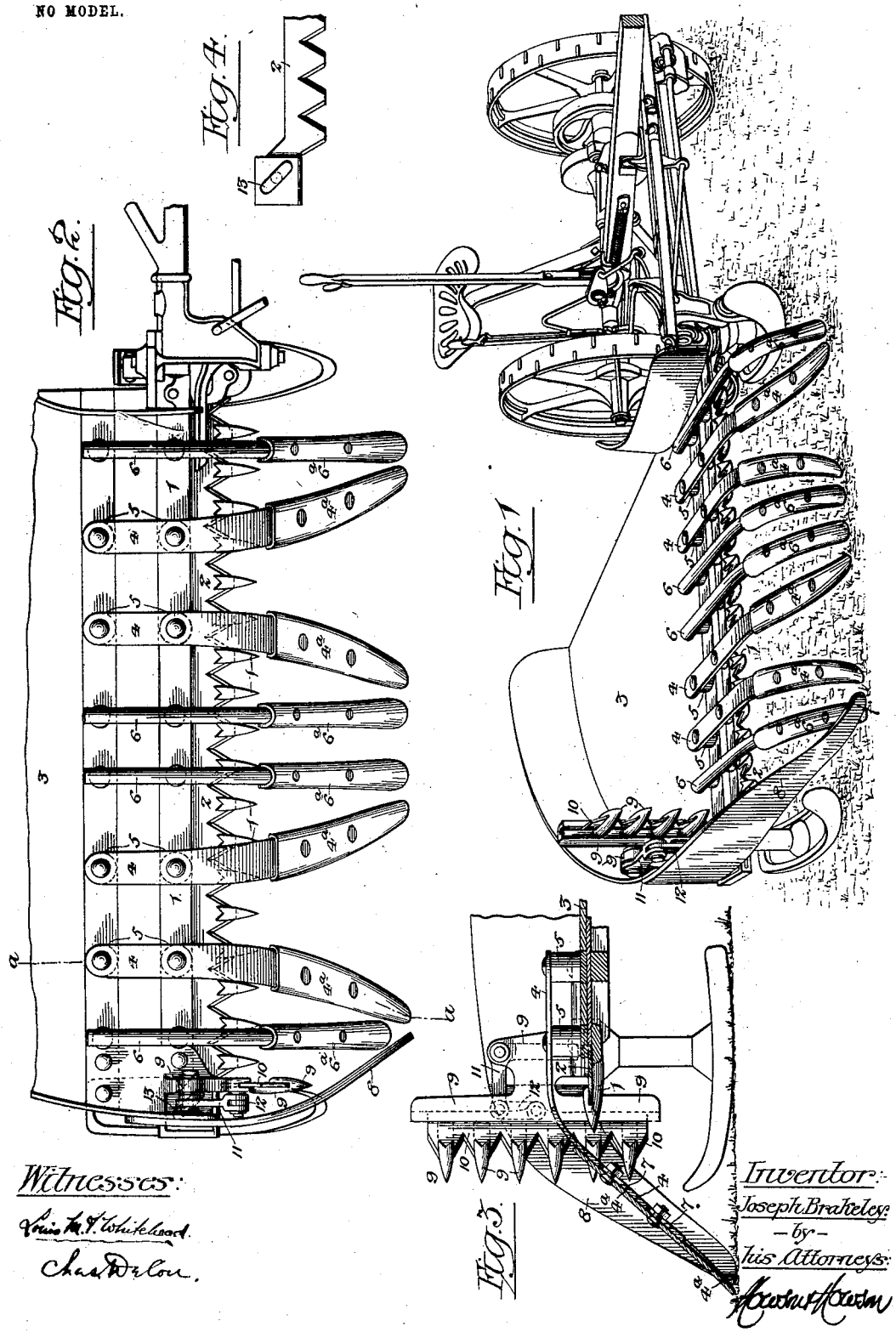
Witnesses:
Inventor:
Joseph Brakeley,
by
his Attorneys No. 747,314. Patented December 15, 1903.

UNITED STATES PATENT OFFICE.

JOSEPH BRAKELEY, OF FREEHOLD, NEW JERSEY, ASSIGNOR OF ONE-HALF TO ASHER BRAKELEY, OF BORDENTOWN, NEW JERSEY.

VINE-HARVESTING MACHINE.

SPECIFICATION forming part of Letters Patent No. 747,314, dated December 15, 1903.

Application filed January 25, 1901. Serial No. 44,752. (No model.)

*To all whom it may concern:*

Be it known that I, JOSEPH BRAKELEY, a citizen of the United States, and a resident of Freehold, Monmouth county, New Jersey, have invented certain Improvements in Vine-Harvesting Machines, of which the following is a specification.

The object of my invention is to provide a machine for harvesting vines or plants, such as pea-vines, (hereinafter referred to simply as "vines,") in which the crop is mainly at the upper part of the vine, my improved machine being adapted to cut off the vines at any desired distance above the surface of the ground, so as to harvest only the crop-bearing portion of the same, and thereby save the expense of carting a large mass of worthless vines from the field and also overcome the inconvenience of handling this useless mass in the shelling or other machines to whose action the harvested vines are subsequently subjected.

In the accompanying drawings, Figure 1 is a perspective view of a harvesting-machine constructed in accordance with my invention. Fig. 2 is a plan view, on a larger scale, of the cutting mechanism and vine-handling devices of the machine. Fig. 3 is a transverse section on the line $a\ a$ of Fig. 2, and Fig. 4 is a detached view of part of the main cutter-bar or knife of the machine.

I have illustrated my invention as applied to an ordinary form of mowing, reaping, or harvesting machine, of which any desired type may be employed, 1 representing the finger-bar of such a machine, 2 the reciprocated cutting-bar or knife coöperating therewith in the usual manner, and 3 the platform for receiving the harvested portions of the vines or plants. The finger-bar and its knife or cutter are located some distance above the surface of the ground, so as to cut the vines or plants at a correspondingly-elevated point, and by preference the type of machine used is one in which the cutter is adjustable vertically, so as to be adjusted to different heights from the surface of the ground.

When vines having the crop-bearing portion comparatively high are harvested in the usual way by means of an ordinary mowing-machine having its cutter-bar close to the ground, a large mass of useless vines have to be transported and handled in the subsequent treatment of the crop. When an elevated cutter is used, however, this harvesting of useless vines is prevented; but it becomes necessary to raise the vines for the action of the cutter, since at the time of harvesting the plants are usually beaten down or thrown over to one side or other of the row, and some means for lifting the crop-bearing portions of the vines above the level of the cutter must therefore be used.

In the present instance I employ on each side of each row of vines inclined lifting-fingers 4, two pairs of these fingers being shown in the drawings, as the machine is intended for acting simultaneously upon two rows of vines. The fingers of each pair are flared apart at their lower ends to such an extent that the stems or stalks of the vines in the row can pass between them without necessitating too close or accurate guidance of the machine, the fingers 4 of each pair converging toward each other at the top, so that they not only lift the vines, but also straighten up the stems or stalks of the same for the action of the cutter of the machine, the upper portion of each finger extending backwardly over the finger-bar, cutter, and forward portion of the platform 3, so as to provide support for the lifted portion of the vine after the same has been severed and while it is traveling backwardly onto the platform 3. These elevated portions of the fingers 4 are supported upon studs or posts 5, rising from the rear portion of the finger-bar 1 and from the forward portion of the platform 3, although any desired means of supporting the fingers at the proper level above the cutter may be adopted.

Outside of each pair of lifter-fingers 4 and also between the two pairs are supplementary lifter-fingers 6, inclined as to their forward portions and extending backwardly over the finger-bar and forward portion of the platform as to their upper portions, these supplementary lifters serving to raise and support the mass of vines not directly acted upon by the main lifter-fingers 4. The downwardly-bent front ends of the fingers 4 have shoes $4^a$, and the like portions of the fingers 6 have similar adjustable shoes $6^a$, each of said adjustable shoes being adjustably held in place on its respective finger by means of a bolt adapted to a slot 7 in said finger and provided with a suitable securing-nut, so that each shoe may be adjusted so as to travel close to the surface of the ground irrespective of the height to which the finger-bar and cutter of the harvesting-machine are adjusted, it being understood that the height of the latter will be dependent upon the condition of growth of the vine and the distance from the ground at which the crop-bearing portion of the same is located.

To prevent the foliage of a row of vines outwardly beyond a row which is being harvested from interfering with the free harvesting of said vines, I employ at the outer end of the finger-bar structure of the machine a laterally-deflected lifting-finger 8, which serves to push away the mass of uncut vines from those which are being harvested, and in connection with this outer finger I use a vertical bar 9 and cutter bar or blade 10, whereby the mass of vines outwardly beyond the swath which is being harvested will be severed from the vines composing said swath.

Various means may be employed for imparting the desired reciprocating movement of the vertical cutting bar or knife, the means shown in the present instance for accomplishing this object being a bell-crank lever 11, hung to a suitable bearing on the fixed structure of the machine and connected by a link 12 to the vertical cutter-bar, the lower end of the depending arm of said bell-crank lever 11 having an antifriction-roller which is adapted to an inclined slot 13, Fig. 4, in the enlarged outer end of the main cutter-bar 2 of the machine, whereby as said bar is reciprocated vibrating movement will be imparted to the lever 11 and consequent vertical reciprocating movement to the vertical cutter-bar.

In its broader embodiments my invention contemplates the use of any available form of cutting mechanism and is not, therefore, limited to the specific forms of reciprocating cutters shown and described.

Having thus described my invention, I claim and desire to secure by Letters Patent—

1. A reaping or harvesting machine having an elevated bar carrying fingers, a transversely-reciprocable cutter movable on said finger-bar, a platform and a pair of lifting-fingers supported in an elevated position upon said platform and finger-bar, said fingers being attached to the machine above and in the rear of the cutter and projecting forwardly and downwardly in advance of the cutter and diverging toward their lower front ends, substantially as described.

2. The combination in a harvesting or reaping machine of an elevated cutter, with a pair of rearwardly-converging lifting-fingers attached to the machine in the rear of and above said cutter and adapted to run one on each side of a row of vines so as to lift the same for the action of the cutter-bar, and supplementary lifting-fingers parallel with the line of motion of the machine and placed on each side of said main lifting-fingers, substantially as described.

3. The combination in a harvesting-machine, of an elevated cutter having in one end a slot inclined to the length of said cutter, a vertical cutter at the slotted end of said knife, a bell-crank lever supported from the platform and having one end in engagement with said vertical cutter and the other end in the slot in the end of the horizontal cutter, substantially as described.

In testimony whereof I have signed my name to this specification in the presence of two subscribing witnesses.

JOSEPH BRAKELEY.

Witnesses:
 WILL. A. BARR,
 F. E. BECHTOLD.